United States Patent
Bratty et al.

(10) Patent No.: US 8,747,678 B2
(45) Date of Patent: Jun. 10, 2014

(54) NICKEL SULPHIDE PRECIPITATION PROCESS

(75) Inventors: Michael Bratty, Vancouver (CA); Rick Lawrence, Vancouver (CA); David Kratochvil, Vancouver (CA)

(73) Assignee: Bioteq Environmental Technologies Inc., Vancouver, British Columbia (CA)

( * ) Notice: Subject to any disclaimer, the term of this patent is extended or adjusted under 35 U.S.C. 154(b) by 0 days.

(21) Appl. No.: 11/886,944

(22) PCT Filed: Mar. 30, 2007

(86) PCT No.: PCT/CA2007/000521
§ 371 (c)(1), (2), (4) Date: Sep. 20, 2007

(87) PCT Pub. No.: WO2007/112562
PCT Pub. Date: Oct. 11, 2007

(65) Prior Publication Data
US 2009/0068076 A1    Mar. 12, 2009

Related U.S. Application Data

(60) Provisional application No. 60/787,659, filed on Mar. 31, 2006.

(51) Int. Cl.
   *C02F 1/62* (2006.01)
   *C02F 1/20* (2006.01)
   *C22B 23/00* (2006.01)

(52) U.S. Cl.
   USPC ........... 210/723; 210/224; 423/138; 423/139; 423/140; 423/141

(58) Field of Classification Search
   USPC .............. 423/138, 139, 140, 141, 255.31; 208/215; 210/723, 724
   See application file for complete search history.

(56) References Cited

U.S. PATENT DOCUMENTS

| | | | |
|---|---|---|---|
| 2,722,480 A | 11/1955 | Roy et al. | 75/108 |
| 2,789,033 A | 4/1957 | Praett et al. | 23/134 |
| 3,450,495 A * | 6/1969 | Coulter et al. | 423/37 |
| 3,649,250 A * | 3/1972 | Dorenfeld et al. | 75/713 |
| 4,073,860 A * | 2/1978 | Huggins et al. | 423/140 |
| 4,110,400 A * | 8/1978 | Jha et al. | 423/141 |
| 4,547,347 A * | 10/1985 | Lussiez et al. | 423/141 |
| 5,354,359 A * | 10/1994 | Wan et al. | 75/744 |
| 5,578,079 A | 11/1996 | Kamel et al. | 623/6 |
| 5,587,079 A * | 12/1996 | Rowley et al. | 210/603 |
| 2003/0192832 A1* | 10/2003 | Bowers | 210/722 |

FOREIGN PATENT DOCUMENTS

| | | | | |
|---|---|---|---|---|
| AU | 2005/201775 A1 | 12/2005 | | |
| CA | 540517 | 5/1957 | | 53/307 |
| CA | 976364 | 10/1975 | | 53/307 |
| JP | 2003205293 A * | 7/2003 | | C02F 1/62 |

OTHER PUBLICATIONS

Caiqiao et al., "Treatment of solution from atmospheric sulfuric acid leaching of ocean polymetallic nodules," Hydrometallurgy, Proceedings of the International Conference, 3rd: Kunming, China, Nov. 3-5: 370-375 (1998).

* cited by examiner

*Primary Examiner* — Carlos Barcena
(74) *Attorney, Agent, or Firm* — Medlen & Carroll, LLP

(57) ABSTRACT

The invention provides hydrometallurgical processes by which dissolved nickel may be removed from water at ambient temperature and low system pressure.

33 Claims, 1 Drawing Sheet

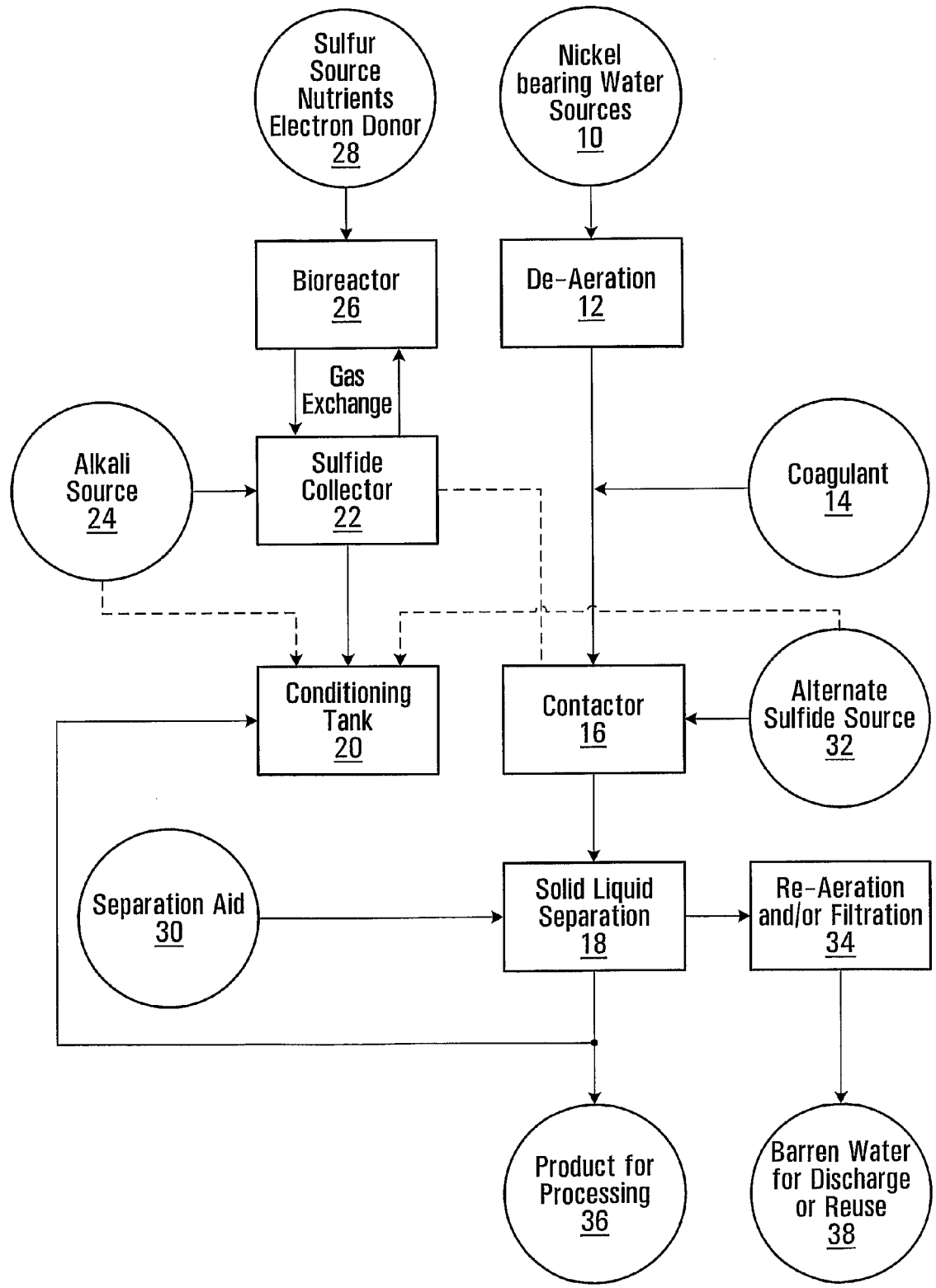

NICKEL SULPHIDE PRECIPITATION PROCESS

This application is a U.S. national entry of International Application No. PCT/CA2007/000521, filed on Mar. 30, 2007, which claims priority to U.S. Provisional Application No. 60/787,659, filed on Mar. 31, 2006.

FIELD OF THE INVENTION

The invention is in the field of hydrometallurgy, relating more specifically to process by which dissolved nickel may be removed from aqueous solutions.

BACKGROUND OF THE INVENTION

U.S. Pat. No. 5,587,079, incorporated herein by reference, discloses processes for treating solutions containing sulfate and metal ions, including processes in which bacteria are used to provide hydrogen sulphide for treating solutions containing metal ions. It has been suggested that to efficiently precipitate nickel sulphides from aqueous solutions, it is necessary to use low pH and elevated temperatures and pressures, as is disclosed in Canadian Patent No. 540,517 and U.S. Pat. Nos. 4,110,400 and 4,547,347.

There remains a need for alternative processes for treating aqueous solutions containing dissolved metals.

SUMMARY OF THE INVENTION

The invention provides processes for precipitating nickel ions from aqueous solutions. Selected embodiments of the process may be carried out at relatively high pH and at ambient temperatures and pressure. The process may be adapted to treat solutions having relatively low levels of dissolved nickel, for example less than 1 g/L. The process may also be adapted to provide treated barren solutions having very low concentrations of nickel, such as less than 10 ppm.

In alternative embodiments, processes of the invention may include continuous or batch processes for treating pregnant aqueous solutions containing dissolved nickel ions. Pregnant solutions may be contacted with a dissolved sulphide in a contactor, to form solid nickel sulphide, under selected contactor conditions. Concentrations of sulphide in the contactor may be adjusted so that the sulphide is in stoichiometric excess over the concentration of dissolved nickel. In some embodiments, contactor conditions may for example include a pH of between 6 and 9 together with ambient temperatures and pressures. Temperatures may for example be between 0° C. and 50° C., and pressures may be between 0.5 atmosphere and 1.5 atmosphere. Solid nickel sulphide may be separated from the pregnant solution to provide a nickel sulphide sludge and a barren water solution. The nickel sulphide sludge may for example have a mean nickel particle size above a selected threshold, for example of at least 5 microns. The barren water solution may have a dissolved nickel concentration below a desired threshold, for example less than 10 parts per million. In some embodiments, at least a portion of the nickel sulphide sludge may be recycled to the contactor to seed nickel sulphide particle growth, which may facilitate the separation of nickel sulphide solids. In some embodiments, a coagulant may be dissolved in the pregnant aqueous solution, so that a dissolved coagulant is present when contacting the pregnant solution with the dissolved sulphide. The coagulant may for example be an aluminium salt, such as aluminium chloride. The concentration of solids in the contactor may be controlled, for example so that it is in the range of 10-30 g/L, or so that it is less than 50 g/L. The nickel sulphide sludge recycle to the contactor may for example be carried out so as to maintain a concentration of nickel sulphide particles in the contactor in the range of 5 to 50 g/L, or any range between integers within these values.

The process may be adapted to be relatively efficient kinetically. In some embodiments, for example the mean hydraulic residence time for the step of contacting the pregnant solution in the contactor may be less than 1 hour, or less than 30 minutes. Processes of the invention may be carried out without heating, and contacting temperatures may for example be quite low, such as less than 35° C.

In the contactor, the pH may be maintained, or lowered, below a selected threshold, for example below about 9. This may be carried out, for example, so as to inhibit the formation of solid nickel hydroxide in the contactor. Conversely, an alkali, such as soda ash, may be added to the contactor to maintain the pH above a selected threshold, such as above 6.

BRIEF DESCRIPTION OF THE DRAWINGS

FIG. 1 is a schematic process flow diagram illustrating various aspects of the invention.

DETAILED DESCRIPTION OF THE INVENTION

In some embodiments, the invention provides processes by which dissolved nickel may be efficiently removed from aqueous solutions 10 at relatively low temperatures and pressures, by carrying out the process at relatively high pH. In some embodiments, for example, the process may be carried out so as to produce barren water 38 which meets particular environmental discharge regulations. In some embodiments, even solutions 10 having relatively low nickel concentrations, such as below 1 g/L, may be efficiently treated. In alternative embodiments, the process of the invention may be carried out so that the dissolved nickel concentration in the barren water 38 falls within a range, such as 0.01 to 10 mg/L, or an alternative range between any integer values within this range.

Nickel bearing water sources 10 provide feed solutions that may be treated in various aspects of the invention, including waste water from mining and mineral processing operations, or bleed streams from other processes. In alternative embodiments, the range of metal concentrations in feed solutions 10 may for example be from 10 to 1000 milligrams per litre, or any integer value within this range. However, processes of the invention may also be applied at higher or lower concentrations of dissolved metals. The pH of the feed solutions may vary widely, and may be adjusted prior to treatment in accordance with the invention. For example, in some embodiments the pH of the feed solution 10 may be from 2 to 9, or any integer value within this range. In addition, the feed 10 may be pre-treated to remove selected metals, such as aluminium, iron, copper, cobalt, zinc, arsenic, mercury, lead, manganese or others. Feed solutions 10 may be freshwater or saltwater, or mixtures thereof.

Processes of the invention may be carried out so that nickel is removed, as product for processing 36, in such a way that it may be recovered for sale. The nickel may for example be selectively removed in the presence of other metals, such as copper, cobalt, iron, aluminium or other base metals. Alternatively, other metals may be removed with the nickel so that they are present in the solids produced by processes of the invention.

The process may be adapted so that the process water 38, barren of nickel and other metals, for discharge or reuse, meets various criteria for discharge to the environment.

Selected embodiments of the process are capable of meeting typical discharge criteria, for example such as those set by the EPA for discharges from mines or mineral processors. Discharge criteria may be site specific, however typical criteria for nickel discharge concentrations would for example be 0.2 milligrams per litre, or 0.2 ppm to 10 ppm. In some embodiments, the process may be operated with 95% metal removal efficiency or higher. For alternative applications, the EPA has alternative standards, so that the process could for example be carried out to produce barren water having a nickel concentration of less than: 470 µg/L, 52 µg/L, 74 µg/L, 8.2 µg/L, 610 µg/L or 4,600 µg/L. Similarly, the process is capable of meeting or bettering a 0.04 milligrams per litre criteria for copper, a 0.003 milligram per litre criteria for cadmium and a 0.05 milligram per litre criteria for zinc. These alternative metals may be precipitated as sulphides in particular embodiments of the invention.

In some embodiments, at least a portion of the barren process water 38 may be reused and re-circulated within the processes of the invention. If environmental discharge is not desired, for example if the barren water is recycled, then the process may be operated with a lower removal efficiency.

The process may be adapted to be effective at very low water temperatures, such as 0.1° C. in contactor 16. In alternative embodiments, the process may for example be operated efficiently at temperatures between 0.1° C. and 80° C., or any integer value, or range of integer values, within this range. The process, including the process taking place in contactor 16, may be adapted to take place at neutral or slightly alkaline pH, for example in a pH range of 6 to 9, or any range within this range.

The process, including the process taking place in contactor 16, may be operated at ambient pressure, or at system pressures within 12 inches water column of system gauge pressure. In some embodiments, system pressure, including pressure in contactor 16, may be between 2 and 10 inches of water column gauge pressure, or any value or range within this range.

In various embodiments of the invention, a contactor 16 receives the feed water 10, which may be de-aerated 12, so that nickel sulphide solids are formed in contactor 16. In some embodiments, the feed water may be pretreated with a coagulant 14 to assist in the precipitation of the nickel in contactor 16. The coagulant 14 may for example be an aluminum salt, such as aluminum chloride, aluminum sulphate, sodium aluminate or polyaluminum chloride. Other sources of aluminum may be utilized as coagulants 14, such as other cations, such as ferric sulphate, ferric chloride, ferrous sulphate, or lime. Typically a coagulant is used in cases where a very high nickel removal efficiency is required, such as in the case of a discharge of barren water to the environment.

The contactor 16 may be followed by a solid liquid separation device 18, such as a clarifier 18, which may be used to separate the product solids 36 from the barren process water 38. A separation aid 30, such as a polymer, may be added to the solid liquid separation step 18. The product solids 36 contain nickel sulphide. The product 36 may also contain other metal sulphides, elemental sulphur, inert solids emanating from the feed water, calcium, and aluminum hydroxides. In some embodiments, the process may be carried out so that product contains a selected proportion of nickel solids, for example at least 20% nickel, or at least any integer value up to 20% nickel.

The product solids 36 may be recycled in the form of a slurry from the solid liquid separation device to a conditioning tank 20 or directly to the contactor 16.

A sulphide source 28, such as sodium hydrosulphide or calcium hydrosulphide may be added directly to the conditioning tank 20 or contactor 16. An alkali source 24 such as soda ash, calcium hydroxide or sodium hydroxide may be also be added to the conditioning tank 20 or contactor 16. In the illustrated embodiment, the recycled product slurry passes from the conditioning tank 20 to the contactor 16, where it may be combined with the nickel bearing feed water 10. Additional sulphide 28 and alkali 24 may be added to the contactor 16, for example to assist in the precipitation of the nickel.

The product slurry 36 may be further processed if desired. For example, further processing may comprise dewatering in a filter press or tube press or other device.

The introduction of sulphide 28 to the conditioning tank 20, or the contactor 16, may be controlled so as to control contacting conditions in the contactor 16, such as: the supersaturation ratio of the nickel sulphide, the oxidation-reduction potential (ORP, which may for example be adjusted to be within the range of, or any value between, −50 and −400 mV with respect to a Ag/AgCl electrode) and the pH. The product slurry recycle flow may also be controlled in such a way to control the contacting conditions in the contactor 16, and hence to modulate the precipitation of the nickel sulphide. The conditions in the conditioning tank 20 and contactor 16 may also be controlled to minimize the oxidation of the sulphide to other sulphur species.

In alternative embodiments, the sulphide dose in the contactor 16 may be controlled in a number of ways. In some embodiments, the control may be volumetric, using the known concentration of sulphide reagent and the known concentration of sulphide demand in the feed water, to calculate a stoichiometric excess of sulphide concentration in the contactor above the sulphide demand. In alternative embodiments, the sulphide dose in the contactor may be controlled potentiometrically, for example using measurements of the oxidation reduction potential (ORP) and the pH. In some embodiments, alternative methods of sulphide dose control may be used in concert, for example to adjust or mediate the super saturation of metal sulphides in the contactor. The degree of super saturation may be used to control the rate of formation or precipitation of solids in the contactor, this in turn affects the characteristics of the solids, such as particle size, and density. The characteristics of the solids in turn affects the nature of the downstream solid liquid separation steps.

The nickel sulphide slurry flow may be controlled, for example by monitoring and modulating the mixed liquor suspended solids (MLSS) in the contactor 16. The ORP and the pH in the contactor 16 may be controlled with the objective of minimizing the precipitation of other species of nickel, such as nickel hydroxides and to maximize the precipitation of nickel sulphide. The nickel sulphide which is recycled to the contactor 16 from the solid liquid separation device 18 may act as a catalyst for the precipitation of more nickel sulphide. If the precipitation of nickel hydroxides is not minimized or controlled, then the quantity of recycled nickel sulphide may be reduced, this in turn may reduce the catalytic effect of recycled nickel sulphide on accretion of nickel sulphide particles in the contactor. The addition of sulphide reagent to the recycled nickel sulphide solids in a conditioning tank 20 may be carried out so as to have the effect of dispersing the solids before they are introduced to the contactor 16. In contactor 16, the dispersed solids may be re-coagulated when brought into contact with coagulant 14 in the contactor feed.

In some embodiments, the process conditions may be modulated to achieve selected operating parameters, for example: nickel sulphide particle size in the separated solids of from 1 micrometer to 100 micrometers in diameter, or any range within this range, and/or with an average size of about 10 micrometers, or from 8 to 12 micrometers; nickel recovery efficiency of at least about 95%, 96%, 97%, 98%, 99% or 99.5%, or; sulphide dose of about 10-15 mg/L greater than the theoretical stoichiometric level; effluent total nickel less than about 0.50 mg/L, 0.40 mg/L, 0.30 mg/L, 0.20 mg/L, or 0.10 mg/L; and an effluent that is non toxic according to bioassays. The pH of the contactor may for example be maintained at a selected average, for example of 8 to 9, or any range or value within this range, such as 8.26. The ORP may for example be maintained at a selected value, such as at about −350 mV, or between about −300 mV and −400 mV, measured by a Ag/AgCl electrode. The nickel sulphide slurry may for example be recycled to the conditioning tank 20 so that the conditioning tank 20 contains on average about 10% to 30% solids on a weight basis, or any value or range within this range, such as about 20% solids on a weight basis.

The process may for example be fed with a sulphide produced in a bioreactor 26, as for example is described in U.S. Pat. No. 5,587,079. Sulphides may be collected in a sulphide collector 22, for example using an alkali source 24. Sulphides which are produced as an acid gas, such as bioreactor sulphides, may be mixed with an alkali 24 in the collector 22, for example to produce a sulphide salt, such as sodium hydrosulphide. The alkali source 24 may for example be sodium carbonate, sodium hydroxide, calcium hydroxide, or other sources. The process may be fed by an alternate sulphide source 28, such as chemical sodium hydrosulphide, sodium sulphide, calcium sulphide or other sulphide sources. The bioreactor 26 and the sulphide collector 22 may for example be connected by a fluid connection, to provide for an exchange of gases. Alternatively, the sulphide containing gas from the bioreactor may be introduced directly into the conditioning tank 20 (eliminating a trap), or to another tank for the purpose of collecting the sulphide.

In some embodiments, the conditioning tank 20 may be bypassed, for example if a collector 22 is employed, and a sulphide salt added directly to the contactor 16 along with the recycled product solids 36. Gas from the bioreactor 26 should generally not be introduced directly to the contactor 22, because if it is, then the nickel may precipitate as a fine amorphous solid, making the solid liquid separation 18 step more difficult, and the recovery of nickel inefficient. An alternate source of the gas containing sulphide may also be employed, such as a sulphide generator.

The nickel bearing feed water 10 may be de-aerated 12, for example in a vacuum tower or other device prior to its introduction to the contactor 16, to remove dissolved oxygen, so as to reduce the demand for sulphide in the process. The reduction of sulphide demand may improve the economics of the process, and may reduce the formation of undesirable sulphur species, such as sulphite, in the discharged water. This may for example be important in cases where the nickel bearing feed water 10 has particularly low levels of nickel and contains dissolved oxygen.

The process water leaving the solid liquid separation device 18 may be filtered to remove particulates and/or re-aerated to oxidize residual sulphur species prior to discharge 34, depending on the objectives for the discharge water, such as non-toxicity. A filter aid may be added to assist in the filtration step. A chemical oxidant such as hydrogen peroxide may be added at 34 instead of air to oxidize the residual sulphur species.

The bioreactor 26, if employed, may be fed a sulphur source 28, such as ground elemental sulphur or a sulphate bearing liquid. The sulphur source acts as an acceptor of electrons and sulphide is thus produced for the process. Bioreactor 26 may be fed nutrients necessary for the growth of micro-organisms, as well as an electron donor. The electron donor could be hydrogen gas, a mixture of gasses from a partial oxidation process, other gasses, or it could be an organic electron source, such as acetic acid or ethanol or biomass. Alternative approaches are for example disclosed in U.S. Pat. No. 5,587,079.

Particularly in embodiments in which the process is carried out so as to achieve a relatively high metal removal efficiency, the treated effluent 38 may be used to mix or dissolve sulphide reagent 28 for use in the process. It is significant to this aspect of the invention that dissolved nickel may act as a catalyst for the oxidation of sulphide reagent solution, so that the recycle of barren water 38 treated for this purpose would be undesirable if the barren water contained a high concentration of dissolved nickel.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification are incorporated herein by reference as if each individual publication were specifically and individually indicated to be incorporated by reference herein and as though fully set forth herein. The invention includes all embodiments and variations substantially as hereinbefore described and with reference to the examples and drawings.

The invention claimed is:

1. A continuous process for precipitating nickel ions from aqueous solutions, the process comprising:
   a) providing a pregnant aqueous solution comprising dissolved nickel ions at a concentration of less than 1 g/L and dissolved oxygen;
   b) removing oxygen from said pregnant aqueous solution to provide a de-aerated feed water;
   c) contacting the de-aerated feed water with a dissolved sulphide source in a contactor to form solid nickel sulphide, the contacting being performed under contactor conditions that comprise a contacting temperature of between 0° C. and 50° C., a contacting pressure of between 0.5 atmosphere and 1.5 C. atmosphere, and a contacting pH of between 6 and 9;
   d) separating the solid nickel sulphide from the pregnant solution to provide a nickel sulphide sludge and a barren water solution, wherein the nickel sulphide sludge has a mean nickel particle size of at least 5 microns and the barren water solution has a dissolved nickel concentration of less than 10 parts per million; and,
   e) recycling at least a portion of the nickel sulphide sludge to the contactor under conditions such that said recycled portion seeds nickel sulphide particle growth to provide the mean nickel particle size of at least 5 microns.

2. The process of claim 1, further comprising dissolving a coagulant in the pregnant aqueous solution so that a dissolved coagulant is present when contacting the pregnant solution with the dissolved sulphide.

3. The process of claim 2, wherein the coagulant is an aluminium salt or aluminium chloride.

4. The process of claim 1, wherein the coagulant dose range is controlled to modulate contactor conditions.

5. The process of claim 1, wherein the contacting pH is about 8.3.

6. The process of claim 1, wherein the mean hydraulic residence time for the step of contacting in the contactor is less than 1 hour.

7. The process of claim 1, wherein the mean hydraulic residence time for the step of contacting in the contactor is less than 30 minutes.

8. The process of claim 1, wherein the mean hydraulic residence time for the step of contacting in the contactor is about 20 minutes.

9. The process of claim 1, wherein the contacting temperature is less than 35° C.

10. The process of claim 1, wherein the process is carried out without heating.

11. The process of claim 1, wherein the contactor temperature is an ambient temperature.

12. The process of claim 1, wherein the contactor pressure is within 0.5 atmosphere of ambient pressure.

13. The process of claim 1, wherein the contactor pressure is an ambient pressure.

14. The process of claim 1, wherein the pregnant aqueous solution comprises a dissolved metal selected from the group consisting of cobalt, copper, iron, zinc, arsenic, mercury, lead and manganese.

15. The process of claim 1, wherein the contactor conditions comprise a contactor oxidation reduction potential, and the contactor oxidation reduction potential is of between −50 and −400 mV with respect to a Ag/AgCl electrode.

16. The process of claim 1, wherein the contactor conditions comprise a concentration of contactor solids, and the concentration of contactor solids is less than 50 g/L.

17. The process of claim 1, wherein the sulphide source is selected from the group consisting of a sulphide salt formed from hydrogen sulphide, a hydrogen sulphide, a gaseous sulphide, an alkali metal sulphide and an alkaline earth metal sulphide.

18. The process of claim 17, wherein said sulphide salt is selected from the group consisting of sodium hydrosulphide, calcium hydrosulphide, sodium sulphide, and calcium sulphide.

19. The process of claim 1, wherein the concentration of the sulphide in the contactor is in stoichiometric excess over the concentration of dissolved nickel.

20. The process of claim 1, wherein the nickel sulphide sludge recycle to the contactor is carried out so as to maintain a concentration of nickel sulphide particles in the contactor in the range of 5 to 50 g/L.

21. The process of claim 1, wherein the dissolved nickel concentration in the barren water is 0.01 to 10 mg/L.

22. The process of claim 1, further comprising maintaining the contactor pH below about 9 so as to inhibit the formation of solid nickel hydroxide in the contactor.

23. The process of claim 1, further comprising conditioning the recycled nickel sulphide sludge in a conditioning reactor to peptize the nickel sulphide particles in the sludge before recycling the nickel sulphide sludge to the contactor.

24. The process of claim 23, further comprising adding a sulphide to the conditioning reactor.

25. The process of claim 1, wherein the barren water is used to dissolve a sulphide salt to provide the dissolved sulphide.

26. The process of claim 1, wherein the barren water solution has a dissolved metal concentration that is at least about 95% less than the dissolved metal concentration of the pregnant aqueous solution.

27. The process of claim 1, wherein the barren water solution has dissolved copper concentration of 0.04 milligrams per liter or less, a dissolved cadmium concentration of 0.003 milligrams per liter or less, and a dissolved zinc concentration of 0.05 milligrams per liter or less.

28. A process for precipitating nickel ions from aqueous solutions, the process comprising:
   a) providing a feed solution comprising dissolved nickel ions at a concentration of less than 1 g/L and dissolved oxygen;
   b) removing oxygen from the feed solution to provide a de-aerated feed water;
   c) contacting the de-aerated feed water with a dissolved sulphide source, in a contactor to form a solid nickel sulphide product;
   d) separating the solid nickel sulphide from the feed solution to provide a nickel sulphide sludge product having a mean nickel particle size of at least about 5 microns and a barren water solution; and,
   e) recycling at least a portion of the nickel sulphide sludge product to the contactor under conditions such that said recycled portion seeds nickel sulphide particle growth to provide the mean nickel particle size of at least 5 microns.

29. The process of claim 28, wherein said feed source comprises wastewater.

30. The process of claim 28, wherein the process is carried out without heating.

31. A process for precipitating nickel ions for aqueous solutions, the process comprising:
   a) providing:
      i) an aqueous feed solution, wherein said feed solution comprises dissolved nickel ions at a concentration less than 1 g/L and oxygen;
      ii) a dissolved sulfide source capable of reacting with said nickel ions; and
      iii) a contactor;
   b) removing oxygen from said feed solution prior to introduction of said feed solution into said contactor; and
   c) precipitating said nickel ions with said dissolved sulfide source in said contactor, wherein a solid nickel sulphide is created.

32. The process of claim 31, further comprising:
   d) separating said solid nickel sulfide in a clarifier under conditions such that a nickel sulfide sludge and a barren water solution are created.

33. The process of claim 31, further comprising:
   d) recycling at least a portion of the nickel sulphide product to the contactor.

* * * * *